(12) United States Patent
Miles

(10) Patent No.: US 12,056,246 B2
(45) Date of Patent: Aug. 6, 2024

(54) SYSTEM AND METHOD FOR MANAGING A COMPETITION

(71) Applicant: Tenable, Inc., Columbia, MD (US)

(72) Inventor: Nicholas Miles, Georgetown, KY (US)

(73) Assignee: TENABLE, INC., Columbia, MD (US)

( * ) Notice: Subject to any disclaimer, the term of this patent is extended or adjusted under 35 U.S.C. 154(b) by 245 days.

(21) Appl. No.: 17/657,116

(22) Filed: Mar. 29, 2022

(65) Prior Publication Data

US 2023/0315861 A1 Oct. 5, 2023

(51) Int. Cl.
*G06F 21/55* (2013.01)
*G06F 21/57* (2013.01)
*G06Q 50/10* (2012.01)

(52) U.S. Cl.
CPC ............ *G06F 21/577* (2013.01); *G06F 21/55* (2013.01); *G06Q 50/10* (2013.01)

(58) Field of Classification Search
CPC ........ G06F 21/577; G06F 21/55; G06Q 50/10
USPC .......................................................... 726/25
See application file for complete search history.

(56) References Cited

U.S. PATENT DOCUMENTS

| | | | | |
|---|---|---|---|---|
| 11,071,901 B2* | 7/2021 | Morton | ................... | A63F 13/85 |
| 2016/0027260 A1* | 1/2016 | Pierce | ................. | G07F 17/3276 |
| | | | | 463/7 |
| 2016/0099963 A1* | 4/2016 | Mahaffey | .............. | H04L 63/166 |
| | | | | 726/25 |
| 2017/0214701 A1* | 7/2017 | Hasan | ................. | H04L 63/1491 |
| 2017/0329783 A1* | 11/2017 | Singh | ................... | H04L 63/1441 |
| 2019/0147161 A1* | 5/2019 | Agarwal | ................. | G06F 16/27 |
| | | | | 726/23 |
| 2021/0112083 A1* | 4/2021 | Janakiraman | ....... | H04L 63/1416 |
| 2021/0194924 A1* | 6/2021 | Heinemeyer | ......... | G06F 21/577 |
| 2022/0107802 A1* | 4/2022 | Rao | ....................... | G06F 16/907 |
| 2023/0259632 A1* | 8/2023 | Marciano | .............. | G06F 21/577 |
| | | | | 726/25 |
| 2023/0325511 A1* | 10/2023 | Jaster | .................... | G06F 21/577 |
| | | | | 726/23 |

OTHER PUBLICATIONS

Antonioli, D. et al., "Towards High-Interaction Virtual ICS Honeypots-in-a-Box", 2016, Singapore University of Technology and Design.
Morris, T. et al., "Virtualization of Industrial Control System Testbeds for Cybersecurity", Dec. 2016, 2nd Annual Industrial Control System Security.

(Continued)

*Primary Examiner* — Badri Narayanan Champakesan
(74) *Attorney, Agent, or Firm* — MUNCY, GEISSLER, OLDS & LOWE, P.C.; Daniel Podhajny

(57) ABSTRACT

A system and method are disclosed for automatic management of a capture-the-flag competition and the visual display of the scoring thereof. The system includes a team-specific virtual control system with flags distributed throughout it, a scoring component for receiving the flags and tracking the score for the teams of the competition, and a physical model for visually displaying the completed challenges of the competition on the physical model. The physical model may rotate through display states that each depict the completed challenges for a particular team.

16 Claims, 5 Drawing Sheets

(56) References Cited

OTHER PUBLICATIONS

Giuliano, V. et al., "ICSrange: A Simulation-based Cyber Range Platform for Industrial Control Systems", 2019, HMDR: Holistic Measurement Driven Resilience.
Kucek, S., "An Empirical Survey of Functions and Configurations of Open-Source Capture the Flag (CTF) Environments", 2020, Journal of Network and Computer Applications 151, 102470.

* cited by examiner

SYSTEM AND METHOD FOR MANAGING A COMPETITION

TECHNICAL FIELD

The various aspects and embodiments described herein generally relate to the management of a cybersecurity competition including a model-based display.

BACKGROUND

Information security professionals routinely hone their skills in ethical hacking competitions that pit individuals or teams against each other for control and intrusion of a protected computer system built for the competition. These competitions can be provided in various formats including jeopardy capture-the-flag, king of the hill, capture-the-flag, and attack-defense capture-the-flag. The network being provided as the test bed for these skills and as the playground of the competition is typically an mock enterprise network built in the cloud or with actual computers. The cost for setting up such a system can be expensive and time consuming. The difficulties in set up and operation of a hacking competition for an industrial control scenario is at least an order of magnitude larger.

The devices and connections that make up a real-world industrial control system may involve many hardware layers. Building these hardware layers for a competition can be impossible at a similar scale to an industrial plant. The skilled labor to perform such a set up is expensive as is each of the hardware modules. Accordingly, few competitions have focused on industrial control systems. At the same time, cyber security for industrial control systems has become increasingly important and training for such skills is constantly needed. High profile intrusions and ransomware attacks such as the one on the colonial pipeline have shown the need for further scrutiny of these systems and a better understanding of how hackers navigate such systems. If logistically feasible, hacking competitions for industrial control systems could provide training and insight.

Furthermore, during such a competition, the hacking successes are often illustrated on a physical model for spectators and teams to track progress. The physical model may be a mock-up of the industrial plant. The physical model needs to be reset for different teams or to give periodic visualizations of the progress of the competition as a whole. At present, performing such visualization requires manual input, manual resets, and other time-consuming operations that cannot be accomplished fast enough to accommodate the fast pace of some of these competitions.

Finally, in hacking competitions of enterprise networks, the goal is largely exfiltration and access to information or financials—which mirrors the real-world goals. In contrast, in hacking competitions of industrial control systems, the goals can be destruction, sabotage, and ransomed lockdowns to match real world aims. These goals present problems when multiple teams are attacking the same hardware control set up, since shutdowns and the like can essentially end the competition or prevent other teams from making progress.

There is presently no system or process for automatically initializing a industrial control system as instances that allow for parallel hacking by different teams. Likewise, there is presently no system or process for automatically displaying and re-setting physical models to convey progress of different hacking teams.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In an implementation, the system for managing a competition with one or more teams, the system including one or more simulated control systems associated with a set of challenges of the competition, a scoring component that receives inputs including flags associated with the competition, the scoring component tracking scores of the one or more teams based on the set of challenges, and a model component configured to display one or more effects associated with the challenges in the set of challenges. The flags may be unique identifiers disposed in one or more simulated PLCs or virtual devices of the one or more simulated control systems, and the flags may be associated with interaction between the one or more teams and the one or more simulated control systems with respect to a set of challenges of the competition.

The system may include one or more human-machine interfaces are connected to the one or more simulated control systems. The state of the model component being displayed may correspond with a particular team of the one or more teams, and completed challenges from the set of challenges may be displayed in the model component for the particular team. The one or more simulated control systems may include a team-specific simulated control system for each team of the one or more teams. The team-specific simulated control system for each team of the one or more teams is provided as a parallel instance.

The one or more simulated control systems may connect to one or more publicly accessible resources as an entry point for the one or more teams. The model component may periodically query the scoring component for the scores, wherein the model is configured to switch the one or more effects being displayed between corresponding teams of the one or more teams. The one or more effects may correspond to completed challenges of the set of challenges performed in the one or more simulated control system of each team of the one or more teams. The one or more simulated control systems of each team may be connected to a shared computing resource, the set of challenges being performed in the one or more simulated control systems or the shared computing resource.

The method of managing a competition with one or more teams may include receiving inputs at a scoring component, the inputs including flags associated with interaction between the one or more teams and one or more simulated control systems with respect to a set of challenges of the competition, and displaying, via a model component, one or more effects associated with the challenges of the set of challenges, the model component being connected to the scoring component. The scoring component may track scores of the one or more teams.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION OF THE DRAWINGS

Figure 1:
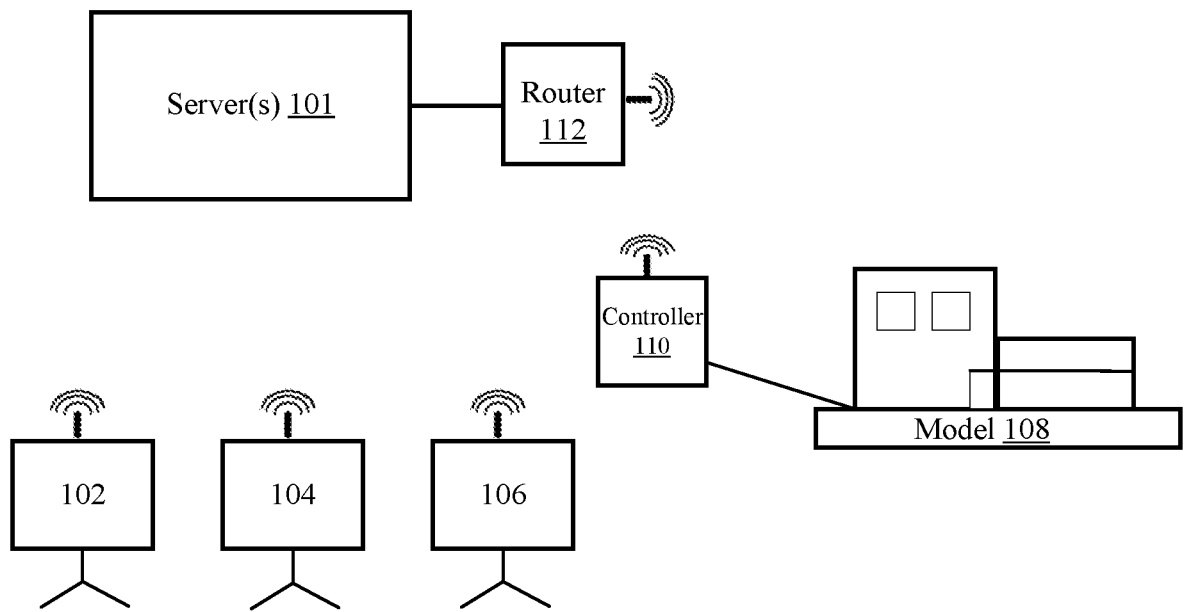
FIG. 1 is a pictorial diagram of a set up for a hacking competition according to an implementation.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset or personal computer may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

Figure 2:
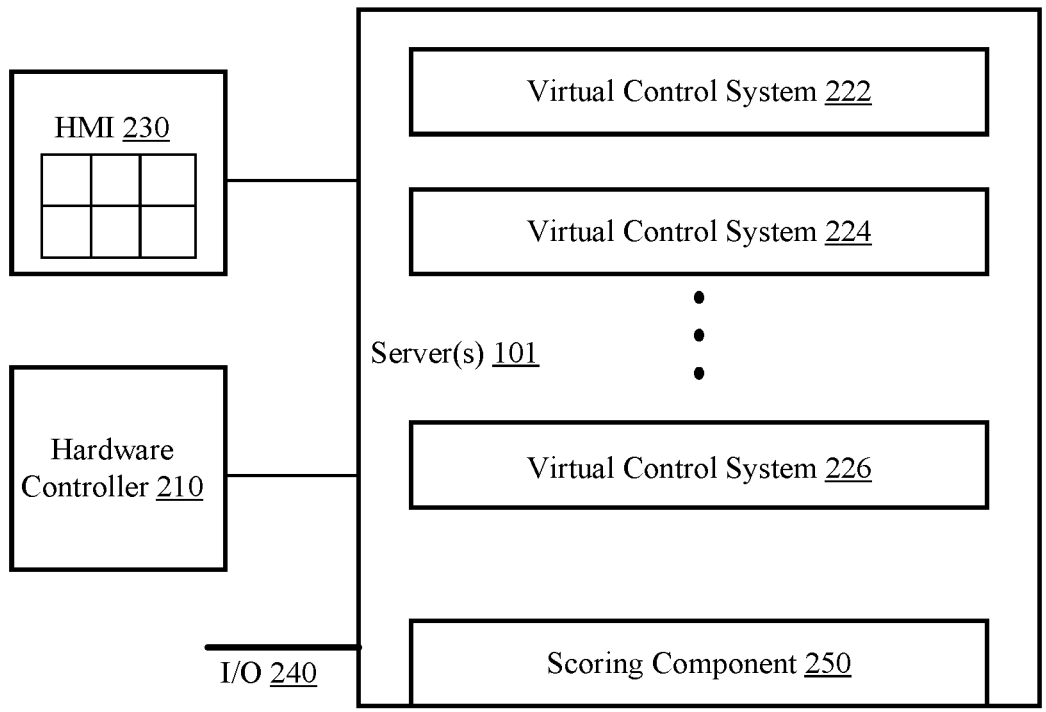
FIG. 2 is a system diagram of the virtual control systems and supporting hardware for the hacking competition according to an implementation.

According to various aspects, FIG. 1 illustrates an exemplary arena for a hacking competition of an industrial control system. The personal computers (PCs) 102, 104 and 106 may be assigned to competitive teams or individuals in the competition. Additional PCs may be provided for additional teams or hackers. The PCs 102-106 may communicate with a router 112 that provides a local area network (LAN) or wide area network (WAN) for the competition. The router 112 and LAN may be connected to the internet and ultimately to one or more servers 101. The one or more servers 101 may also be provided locally at the competition and directly connected to the router 112 or may be provided in the cloud as a computing resource including database and processing capabilities. The PCs 102-106 may connect to the router 112 via wireless links or wired links or a combination thereof. The PCs 102-106 may not be authorized to connect to servers 101 directly or indirectly. Instead, the router 112 may connect PCs 102-106 to public internet to place the contestants at a common starting point for intrusion into the industrial control system. The industrial control system may be provided on the servers 101 as illustrated in FIG. 2. Furthermore, a third piece of the hacking competition set up in FIG. 1 is the model 108 and associated controller 110. The model 108 or model component 108 may represent the outside of the industrial plant that is the simulated subject of the attacks of the competing teams. Controller 110 may connect to the model 108 directly or indirectly (wirelessly or wired) and may execute one or more computer instructions to control visual effects on the model 108 as described in more detail below. The model 108 may be a life-like representation of the industrial plant or a scale model of the industrial plant where in each case the internals (e.g., lights, pumps, tank levels, etc.) may be simulated in some way as described further below.

The servers 101 may not connect to the PCs 102-106 via the same path as controller 110. Specifically, the controller 110 may be configured via virtual private network (VPN), secure connection, or the like to directly connect to servers 101 or any assets on the servers 101. The controller 110 may query the servers for data (e.g., team score data) and transmit data to the servers 101 as the case may be. The controller 110 may include computer instructions that are executed to control lights, switches, actuators, programmable logic controllers (PLCs) and other electronic devices in the model 108. Features of the controller 110 are described in more detail with respect to FIG. 4 and FIG. 8.

The illustrated gaming set up of FIG. 1 may operate to manage a competition and may provide a contained space for ethical hacking to be performed as a part of the competition. The competition may be a form of capture-the-flag (CTF), where teams are provided with a website or public facing entry point and are given flags to capture on the private or secure side of the entry point. That is, servers 101 may provide a website or hosted web interface (e.g., application program interface (API)) together with one or more control systems connected to the website or web interface. The one or more control systems may be protected by firewalls, private network protocols, or other security protections to separate the control systems of the server from the control systems and prevent access beyond the public entry point. The competition may involve one or more ways to circumvent those protections to collect flags (e.g., jeopardy-style CTF) or adversarial teams defending and attacking the protections surrounding the public entry point (e.g., attack-defense CTF).

The design of the control system to be attacked is illustrated in more detail in FIG. 2 where in an implementation servers 101 include several instances of virtual control systems 222, 224, and 226 (or more). These separate instances may operate or include one or more simulation environments. For example, a first set of PLCs may operate and run on a first simulation environment and a second set of PLCs may operate and run on a second, different simulation environment. That is, like the real world, the virtual control systems may each include different controllers with different protocols. The virtual control systems may include an automation network including subnet routing and local bus routing. Each team may be assigned a separate instance of the virtual control system (e.g., a first team receives virtual control system 222), where each separate instance may be identical (including identical flags hidden therein) so that each team is given an identical (or substantially the same) experience in their respective virtual control system.

Within a automation network, automation devices may host or manage one or more networks of devices implementing automation. Such automation may also be simulated with simulated actuators, simulated sensors, simulated internal video, and simulations of other features of an industrial plant (in particular, the industrial plant represented by model 108). The various automation devices may also be programmable logic controllers (PLCs), the central computing module of a PLC backplane, or other central resource. The various automation devices may operate on different protocols such as DeviceNet, CANbus, Profibus, HART, BACnet, Codesys, Modnet, and Profinet, and may operate over different communication connections including ethernet, WiFi, Universal Serial Bus (USB), protocol specific wiring/backplanes, or a combination thereof. The connections between the automation devices in a virtual control system may be different from the communication protocol and hardware of the respective automation device's subnet and may be TCP/IP, IEEE 802.11 or another protocol. One or more automation devices may connect to the public entry point or provide an API to communicate in various ways with the website or entry point.

The contestants or teams of the competition being managed may access a website or API separately hosted on servers 101, the website or API being accessed via input/output connections 240 (e.g., TCP/IP, HTTP, FTP). The website or API that operates as the competition starting point may be hosted elsewhere on cloud hardware or a webhost. The goal of the competition may be to break through or circumvent the firewalls and other protections protecting the virtual control systems 222-226 from malicious attacks to the public facing side. Upon circumvention, each team will be (is directed to be) in a particular virtual control system (e.g., virtual control system 222). On their respective virtual control system, each team must still identify flags, traverse through the automation network of their system and circumvent additional security controls within the automation network.

For example, each of the virtual control systems 222-226 may connect to a physical human-machine interface (HMI) 230 such as a touchpad, joystick, keyboard, or other manual control. The HMI 230 may appear to be connected to industrial machinery (e.g. via configuration file) and may be hacked or spoofed to control simulated equipment or to demonstrate the ability to do such malicious activities. The HMI 230 may have a flag stored in memory or hard storage to allow each team to demonstrate access to the device. Likewise, the separate virtual control systems may connect to one or more hardware controllers 210 that are shared between the virtual control systems. These hardware controllers 210 may be physical hardware or virtual controllers as well. The shared resources of these hardware controllers 210 and HMI 230 allow the competition to include aspects of a king-of the-hill competition where, for example, at the end of the game sole possession of the shared resource(s) will be worth points toward a total score. King-of-the-hill competitions require shared resources between the teams and require teams to use their offensive and defensive skills to take and keep a set of assets (i.e., "the hill").

The servers 101 may host the scoring component 250 which may be a database that contain any records of the competition including logs and monitoring information. The scoring component 250 may be connected to a website (which may be the starting website) or other portal that allows all teams to access it and submit flags retrieved from the competition areas. These flags may be in the form of a hash, certificate, cryptographic code, or other unique data representation (identifier). Each flag wherever placed may be coded to be unique to the team and the place, or may be coded to the place (i.e., the asset storing the flag) such that access to the place or asset may be demonstrated by submission to the scoring component 250.

Figure 3:
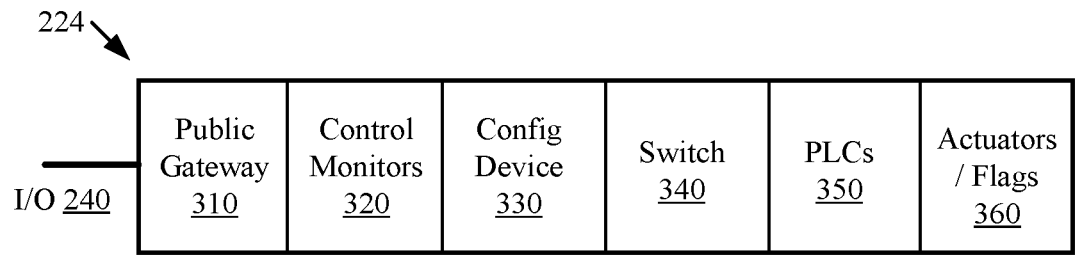
FIG. 3 is a system diagram of the virtual control systems in an instance of a virtual control system according to an implementation.

In FIG. 3 illustrates various components of an automation network topography having various assets 310-360 that are interconnected via one or more network devices and may be in communication with servers 101. The assets 310-360 may be simulations of various hardware types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the sub-net, cloud instances hosted in off-site server environments, etc.), and automation field devices (e.g., PLCs, programmable switches, connected hardware, environment sensors, etc.). Those skilled in the art will appreciate that the assets listed above are intended to be exemplary only and that the simulated assets may include any suitable combination of the above-listed asset types and/or other suitable asset types. Furthermore, in various implementations, the simulated assets may include wired and/or wireless access points, small cell base stations, network routers, hubs, spanned switch ports, network taps, bus masters, backplane control modules, choke points, and so on.

The virtual control system 224 (and similarly the other virtual control system instances) may host a public gateway 310 that is accessed by the particular team assigned to that virtual control system (VCS) 224. Alternatively, the team may be guided to the public gateway 310 of their particular VCS instance via one or more routing switches or path redirects in I/O 240 between the team computer (e.g., computer 102) and the VCS instance 224 or between the router 112 and the VCS instance 224. The public gateway 310 may be a website or other access point for information regarding the control system. The public gateway 310 may connect to control monitors 320 or other computing resources that operate to monitor and manage the virtual control system 224, and specifically, the automation network (e.g., PLCs 350 and actuators 360). The VCS may include a configuration device 330 that may share resources with the control monitors 320 and may operate to deliver configurations to elements of the automation network. The configuration device 330 may be a local bus master for a ring bus of the simulated automation network.

The configuration device 330 and the control monitors 320 may connect to the automation network via one or more switches 340, and each switch 340 may connect to one or more PLCs 350 or other industrial control devices. In the virtual control system 224 these virtual/simulated industrial control devices may be executed in various simulation environments according to their protocol and/or coding language. Importantly, to a hacker (such as team computer 102) the virtual control system 224 may appear to be an industrial control system and may be simulated to align with aspects of the model 108 (e.g., water tank release controls). Furthermore, the intruder may be free to change the configurations of any of the virtual devices or disable them altogether without interfering in the game play or strategy of the other teams/opponents on other VCSs.

Accordingly, the game play or competition for each team on each VCS 222-226 may progress such that the team's skills in evasion and intrusion through various protection measures are tested or required in order to reach one or more flags at various points in the VCS 224. These flags may be on actuators 360 connected to PLCs 350, or on PLCs 350 or switches 340 themselves. The flags may be stored on devices within local buses (i.e., on bus participants) or other end devices (e.g. actuators 360 such as valves, pumps, variable resistors, dials, etc.) to require hackers to traverse the entire hierarchy in order to retrieve a flag. The flag may be a hash, a code, or other unique data segment that may be submitted to the scoring component 250 for recordation that the corresponding challenge has been completed. Intermediate flags may be stored on configuration devices 330, control monitors 320, HMI 230, or other higher-level devices as well. Points given to a team for retrieving a given flag may correspond to difficulty to reach that point of the VCS or based on time taken to each that point (where the flag was stored) or based on timing of success relative to other teams (e.g., first/second/third place points for first teams to submit the flag).

The control monitors 320 may be adapted to (via executable code) detect intrusions and interfere with those intrusions or may be connected to the automation network to detect the level of penetration of the intruder. The actions of the intruder may be logged on the control monitor 320 and destruction of the logs may be a goal of the competition. The control monitors 320 may be programmed to execute instructions that detect when a value, variable, or signal has been changed on a part of the VCS 224 and to report that change to the scoring component 250 as a successful goal reached or to automatically submit a flag or to indicate points should be awarded to a respective team. The control monitor 320 may operate as intrusion detection and prevention (e.g., as a passive or active scanner) or may operate as a competition monitor for the VCS and its respective team, or a combination thereof. The communication between the control monitor 320 and scoring component 250 as well as communication of the VCS 224 with the hackers may be carried out over I/O 240 and/or via separate communication channels.

Figure 4:
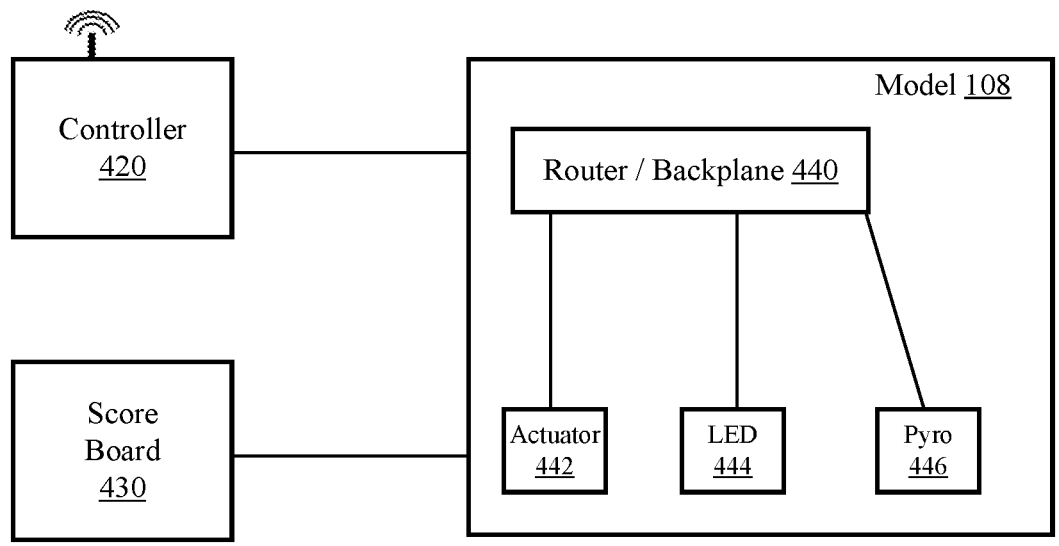
FIG. 4 is a system diagram of a physical model for the hacking competition according to an implementation.

The diagram of FIG. 4 illustrates the components that may be included in the model 108 and associated with the model 108 to render or display the effects of the hacking automatically on the model 108. Model 108 may be connected to a controller 420/110 that provides a computing resource for executing computer-readable instructions that send signals to control actuators in the model 108. The controller 420 may connect to a router or backplane 440 that is connected to an actuator 442, an LED 444, and a pyrotechnic device 446 (e.g., electrically ignitable flame, smoke generator, etc.). The controller 420 may execute instructions to periodically query the scoring component 250 to retrieve the scores of the teams and the completed challenges for each team. A completed challenge may correspond to a specific action or effect displayed on the model 108. For example, access to a valve actuator 360 or pump in the VCS may be rendered on the model as water spilling over the edge of a tank. To accomplish this, an actuator 442 may control a water pump on the model to illustrate the hacking results of that specific team (or all teams together). Likewise, accessing a switch 340 or an actuator switch 360 in the VCS that corresponds to industrial factory lighting and submitting the flag, will, for example, cause an LED 444 to switch off. In this way, spectators of the competition can see the progress of the competition and/or the various teams.

The model 108 may display the effects via mechanical, photonic (e.g., LCD, LED), or other modes of outputting data for presentation or visualization. That is, display may mean mechanical responses that are presented on the model 108, or photonic display of graphics and the like, or other presentation methods, or a combination thereof. Further, the model 108 may directly display information via one or more physical display devices coupled thereto or integrated therewith, or alternatively may indirectly display information by outputting data for presentation to one or more external (or remote) display devices. Hence, as used herein, "displaying" of information may encompass a display of that information via coupled/integrated physical display device(s), or outputting/transmitting data to external display device(s) for display thereon, or a combination thereof.

Figure 8:
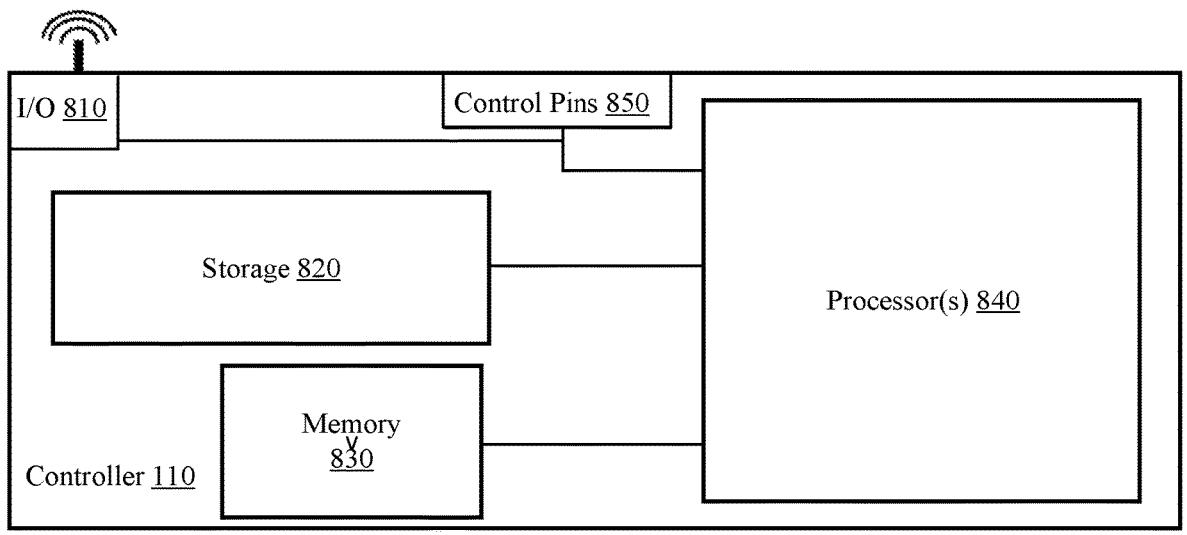
FIG. 8 is a diagram of the controller for the model display according to an implementation.

The controller 420 is illustrated in more detail in FIG. 8 and may operate to wirelessly connect with the router 112 of the competition and allow management of the display of the model 108, manually and automatically. The controller 420 may be connected to score board 430 directly or via the model 108 or its backplane 440. The score board 430 may provide a visual alphanumeric depiction of the team scores that have been retrieved by the controller 420. The controller 420 may query the scoring component 250 periodically or intermittently depending on the display settings of the model 108. For example, the model 108 may, in a first mode, be set to display all team successful attacks or submitted flags—in the beginning of the competition. The model 108 may, in a second mode, be set to iteratively display completed goals (flags) for each team for a defined period (e.g., 2 minutes). The model 108 may, in a third mode, be set to iteratively display completed goals (flags) for each of the top teams for a defined period or only the top/winning team—at the end of the competition, for example.

The model 108 or the score board 430 may provide an indication (visual indicator) to spectators of which team's results are being displayed by the model 108. The model 108 include visible features that correspond to listed goals on the score board 430 such as breach water valve, dump oil, switch off lights, overheat boiler, or other actions that may be taken within a VCS that would have real-world implications on the model 108 in particular. Different models may be provided for model 108 such as office buildings with automation, or oil rigs with control systems, or pipeline control centers. The effects displayed and the intrusion goals of the competition may differ in each case based on the structure of these industrial structures being simulated.

Figure 5:
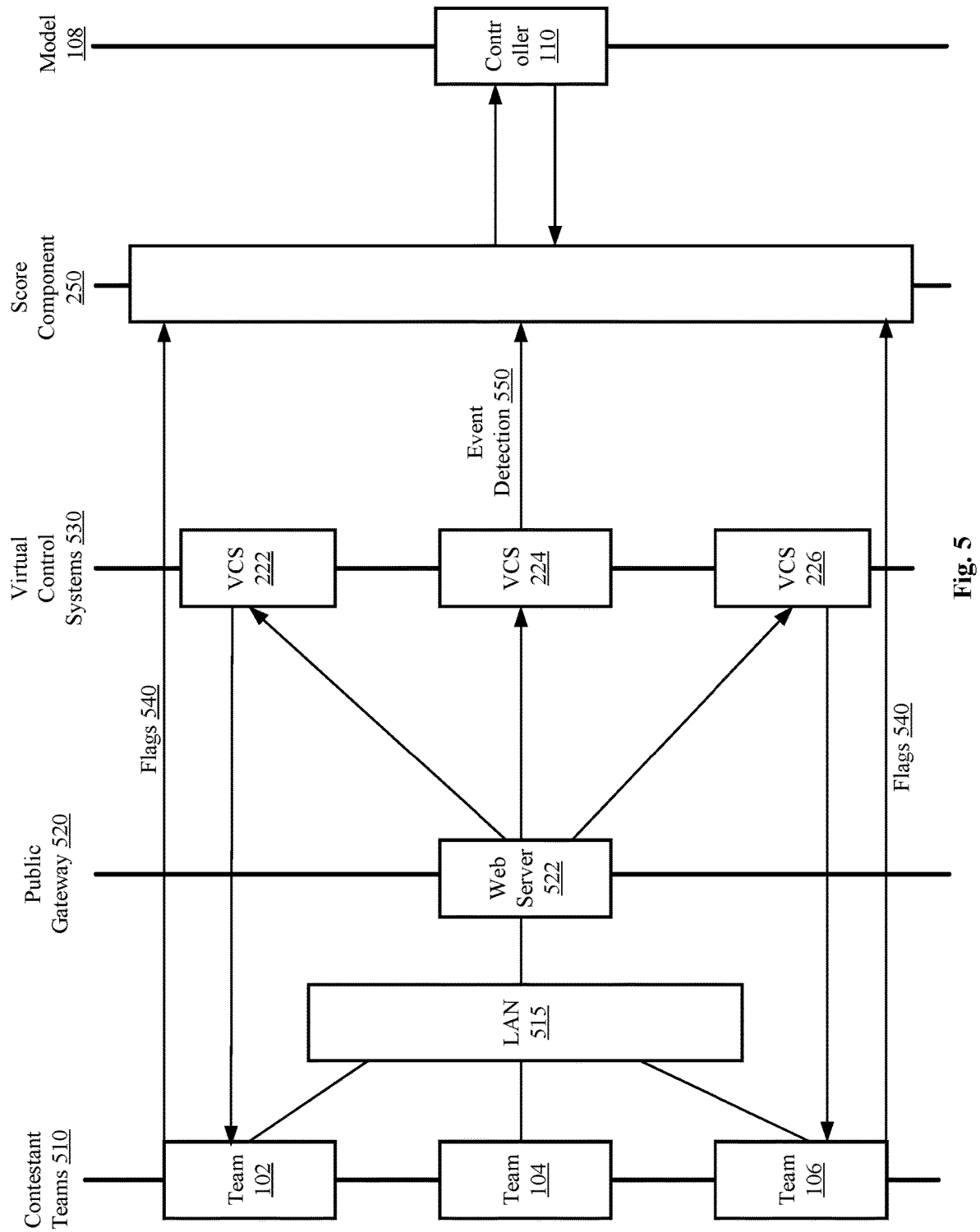
FIG. 5 is a signal flow diagram for the hacking competition as it progresses according to an implementation.

In FIG. 5, a flow of the information for the competition is illustrated according to an implementation. Different flows are contemplated. The team computers 102, 104, and 106 may connect to a local area network 515 which may be hosted by router 112. The team computers 102-106 may then connect to the webserver 522 which may host a website for the competition or a public access point or gateway 520 for entry to the competition. Each team may then be directed on a separate path (e.g., virtual connection or tunnel) to a respective, corresponding virtual control system (VCS) 222, 224, 226, and so on. The virtual control systems 530 may be hosted on servers 101 and may each be identical instances that provide the same hacking experience to each team. That is, the automation network topography and the configurations of the devices therein may be identical for each of the virtual control systems (VCS) 530 and/or VCS 222-226.

Once a team has accessed their respective VCS (e.g., VCS 224), the hackers may further traverse the hierarchy of the network as described with respect to FIG. 3. Upon reaching the actuators and demonstrating control of them or retrieving a flag stored on the actuator, a team may send the flag 540 to the score component 250. The score component 250 validates or verifies the flag and may assign points associated with the flag to the corresponding team. For example, the first one or more characters of a flag may relate to the team, the next sequential one or more characters may relate to the location or the device associated with (storing) the flag in the VCS, and the final one or more characters may be a unique string to prevent brute-forcing the scoring component 250. The scoring component 250 then stores the validated flags 540 and records a score for each team in a database. The score may depend on timing, the relative progress of other teams, and/or the flag 540 itself.

The VCS 224 or any of the other VCSs 530 may include an event detector such as control monitors 320 that may record intrusion success by one or more teams and relays that success to the score component 250. The relayed success may be in the form of a hash or other validated token that may be both unique and related to the team and/or action taken. The score component 250 may store flags, scores, team names, and other competition related information including system logs of the individual VCSs 222-226. The controller 110 or 420 may then query the score component 250 and retrieve the completed goals and scores for each team to display on model 108. The controller 110 may also relay information related to the model 108 to the score component including a display mode of the model 108 or a manual command from a competition manager. In particular, the score component 250 may record and provide the official competition clock and may provide the timing information to the controller 110 or model 108, or score board 430, or to team computers 102-106.

Figure 6:
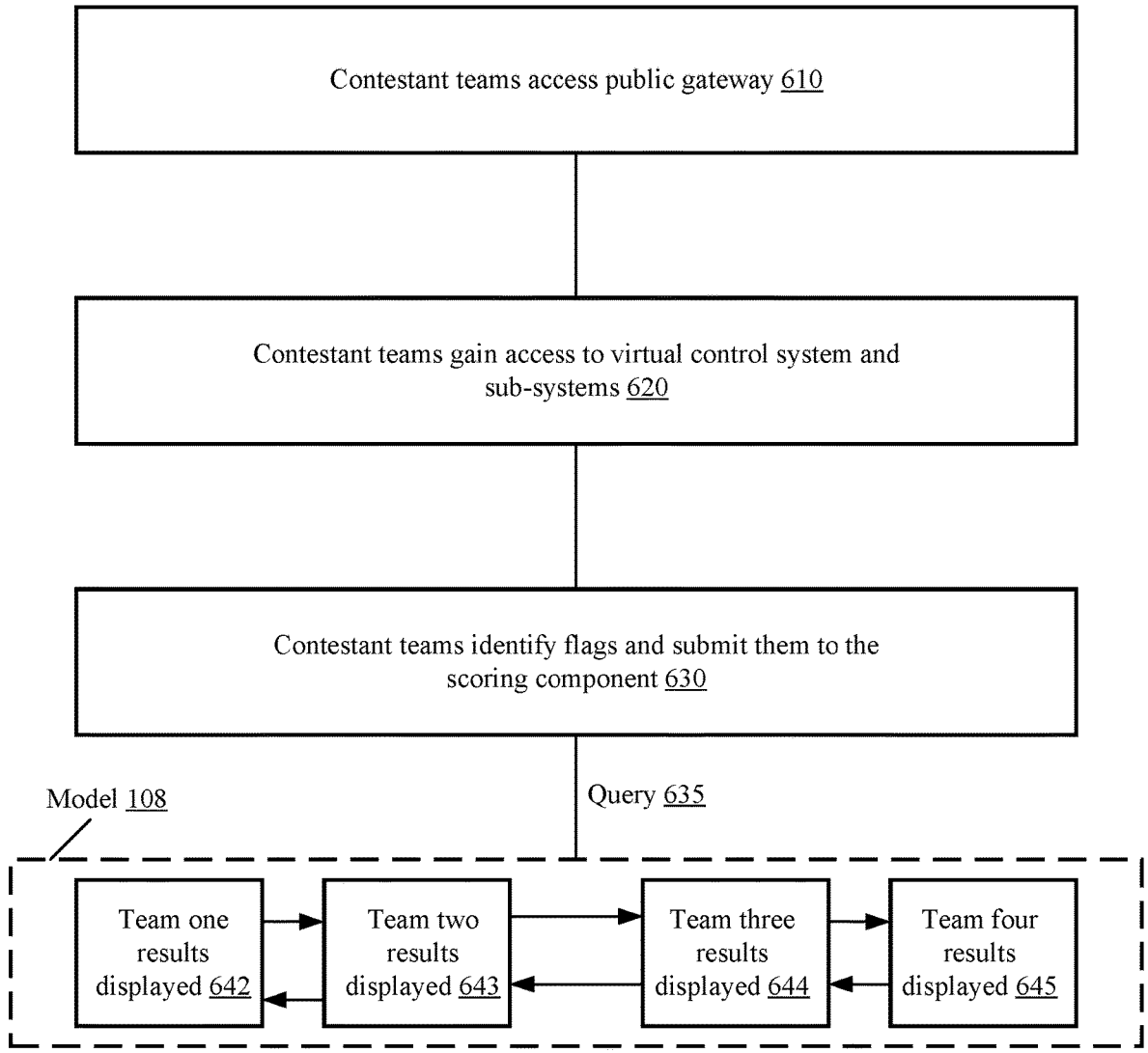
FIG. 6 is a process overview of the hacking competition and model display according to an implementation.

In FIG. 6 the process of the competition and scoring is illustrated in more detail. At step 610, the contestant teams access the public gateway (e.g., given IP address). At step 620, the contestant teams gain access to the virtual control system by intrusion with separate VCSs being assigned to each of the teams. In other words, the contestant team is allocated a tunnel or private pathway to their respective VCS which may then be breached by the contestant team. As a result, the contestant team may also gain access to subsystems and may continue to breach intermediate defenses in the VCS. The contestant team may progress through the VCS toward a goal. At step 630, one or more contestant teams may identify one or more flags within the VCS and may submit the flags to the scoring component 250. The scoring component 250 may be queried at step 635 by the model 108 or controller 420/110 associated with the model 108. The model 108 may then display the team one results at step 642. These results, for example, may be a score of 20 on the score board 430 and lights (LEDs 444) of the model 108 blinking out. In order to display the results of the team intrusions, the model 108 may begin in what appears to be a normal operating state of the depicted building. The results are then illustrated as changes to the normal operating state.

Then the model 108 may reset to normal and after a delay may display the team two results at step 643. These results may be, for example, smoke pouring out of a window of the building and 50 points on the score board 430 for "overheating boiler." Likewise, the model 108 may then be reset to normal for a period (e.g., allow smoke to clear) and then the display of the results of team three are displayed at step 644, where one or more actions may be displayed including those previously displayed. Then the model 108 is reset to normal for a period and the results for team four are displayed at step 645. The cycle may then repeat to step 642 as described above or continue to more teams. The scores and results of the teams are periodically or intermittently updated by query step 635. The display results may be interruptible by controller 420 including by changing a mode display setting. For example, only the winner may be displayed (e.g., team one as at step 642). Other display modes are contemplated as described herein.

The display effects may be rapidly and automatically resettable either by a switch or by further actuators and supplies provided in the model 108. The one or more display effects may be each mapped to one or more goals displayed on the score board 430 as well. The one or more display effects may be each mapped to one or more goals for hacker or contestant teams to achieve within the VCS. The scoring component 250 may store these mappings and may apply the mappings to convert signals or flags indicating an achieved goal into a score for the respective team and generate/save a state for the model 108 based on the mappings. One of more of the display effects for the model 108 may be displayed entirely by video, on a video screen, in augmented reality, or in virtual reality. In the case of virtual reality, the model 108 may be represented entirely in a metaverse or virtual competition space.

In an implementation, the virtual control systems (VCS) 222-224 for each team may be provided on a server with a simulated control system and multiple simulation sessions such that one simulation environment may provide the separate intrusion experiences for each team. That is, the teams may be separated in the simulation environment via session identifiers (IDs) or session tokens. Likewise, players/teams may be assigned tokens and sessions upon entry of the public gateway or web interface. The simulated sessions may each have all aspects of the VCS 530 (or other VCSs mentioned herein) and may progress in different directions with different experiences based on the actions of the contestants in the sessions. That is, for example a shutdown of an interface in the VCS by a contestant in one session may block that interface for the entire competition for only that contestant in that session. In this way, like the real world, indiscriminate damage may prevent high scores. In this case, flags may be submitted or contain the session ID for tracking by the scoring component. A team that fails may then restart with a new session and a zero score.

In an implementation, the state of a VCS instance may be saved, mirrored, and/or reloaded by a team so that in a multi-day competition, each team may begin where they left off. Likewise, session states for each session ID may be saved, mirrored, and/or reloaded by a team. The competition may end when all goals have been completed by a team or by all teams. The competition may end when a game clock expires or when a competition manager announces the end. The VCS for each team or the scoring component 250 may store the logs or upload the logs to the competition website for further educational benefit.

Figure 7:
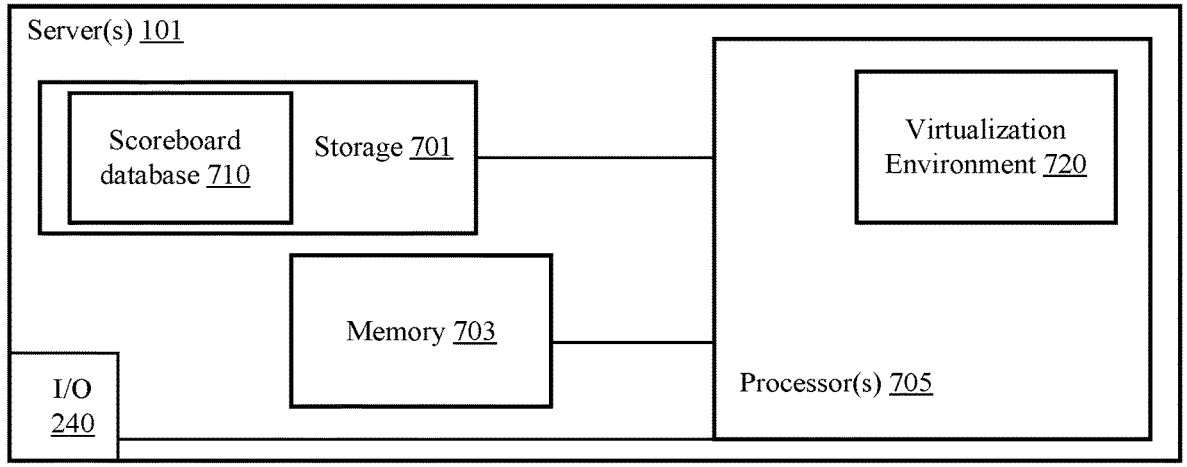
FIG. 7 is a diagram of the servers hosting the hacking competition according to an implementation.

In FIG. 7, the servers 101 are illustrated with exemplary hardware and features which store and execute the functions previously described. The servers 101 may include storage 701 which may include hard drives, compact disks, flash memory, non-volatile memory express (NVMe), solid state drives, tape drives, or other storage devices. The storage 701 may be connected to processors 705 which may be computer processing units (CPUs), application specific integrated circuits (ASICs), field programmable arrays (FPGAs), microcontrollers, virtualized computing resources, or other hardware for executing computer-readable instructions. The processors 705 may be connected to memory 703 which may be random access memory (RAM), NVMe, or the like. The processors 705 may be connected to external devices (e.g., team computers 102-106 or router 112) and/or the internet via input/output interface 240. The input/output interface 240 may include gigabyte ethernet, fiber optics, WIFI, ZigBee, BLUETOOTH, or other wired or wireless interfaces. The servers 101 may be distributed or may be collocated or may be thinly-provisioned, scalable cloud servers (e.g., virtual machines). The servers 101 may be local computing resources at the competition location.

The storage 701 may host a database application for a relational or non-relational database (e.g., MySQL, NOSQL, MongoDB) for storing the competition data as a scoreboard database 710. As noted above, the scoreboard database 710 may store intrusion logs from control monitors 320, flags submitted by teams, scores accumulated by teams, settings for the model, and other competition data. The storage 701 may also store saved sessions or VCS instances. The processors 705 may host a virtualization environment 720 among other program code being executed. The virtualization environment 720 may initiate and operate the VCS instances or sessions, and may operate one or more PLC simulators (e.g., OpenPLC, Modbus simulator). The virtualization environment 720 may connect to actual hardware controllers 210 or HMIs 230 (as hardware-in-the-loop) in order to provide shared resources for common competition territory for the contestants (e.g., king-of-the-hill goal). Other simulators may be provided in the virtualization environment 720 to provide other industrial or building controls and automation devices as may be needed.

The controller 110 of FIG. 8 (or, likewise, controller 420) is illustrated with exemplary hardware which includes local processors 840 that may be CPUs, ASICs, FPGAs, or other processor circuits. These processors 840 may connect to storage 820 for storing game information, settings for the model, and any information needed by the control system of the model 108. The storage 820 may be flash memory, solid state memory, or other forms of non-volatile memory. The processors 840 may connect to memory 830 which may be RAM or other forms of volatile memory including cache or on-chip memory. The processors 840 and the controller 110/420 as a whole may connect to the model 108 and router 112 via one or more I/O interfaces 810. The connection to the router 112 maybe via a WIFI interface, for example, and the connection to the model may be via universal serial bus (USB) or micro-USB, or other connection protocol. The control pins 850 may provide direct wired connections to various elements of the model 108 (e.g., LEDs 444) and/or may form signal connections with controllers or actuators within the model 108. The controller 110 may be a microcomputer, a laptop, a Raspberry PI, or other computer.

Those skilled in the art will appreciate that information and signals may be represented using any of a variety of different technologies and techniques. For example, data, instructions, transmissions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A system for managing a competition with one or more teams, the system comprising:
    one or more simulated control systems associated with a set of challenges of the competition;
    a scoring component that receives inputs including flags associated with the competition, wherein one or more characters of the flags indicate a team, a location and a device location storing the flags, the scoring component tracking scores of the one or more teams based on the set of challenges and validates the flags and assigns points associated with the flags to the corresponding team; and
    a model component configured to display one or more effects associated with the challenges in the set of challenges,
    wherein the model component periodically queries the scoring component for the scores,
    wherein the model component is configured to switch the one or more effects being displayed between corresponding teams of the one or more teams,
    wherein the one or more effects corresponds to completed challenges of the set of challenges performed in the one or more simulated control system of each team of the one or more teams, and
    wherein the set of challenges correspond to a set of security intrusions of the one or more simulated control systems and the points assigned in association with the flags are based on a difficulty associated with a respective security intrusion or a speed in which the respective security intrusion is performed or a combination thereof.

2. The system of claim 1, wherein the flags comprise unique identifiers disposed in one or more simulated programmable logic controllers (PLCs) or virtual devices of the one or more simulated control systems, and wherein the flags are associated with interaction between the one or more teams and the one or more simulated control systems with respect to the set of challenges of the competition.

3. The system of claim 1, wherein one or more human-machine interfaces are connected to the one or more simulated control systems.

4. The system of claim 1, wherein a state of the model component being displayed corresponds with a particular team of the one or more teams, and
wherein the completed challenges from the set of challenges are displayed in the model component for the particular team.

5. The system of claim 1, wherein the one or more simulated control systems include a team-specific simulated control system for each team of the one or more teams.

6. The system of claim 5, wherein the team-specific simulated control system for each team of the one or more teams is provided as a parallel instance.

7. The system of claim 1, wherein the one or more simulated control systems connect to one or more publicly accessible resources as an entry point for the one or more teams.

8. The system of claim 1, wherein the one or more simulated control systems of each team are connected to a shared computing resource, the set of challenges being performed in the one or more simulated control systems or the shared computing resource.

9. A method of managing a competition with one or more teams, the method comprising:
receiving inputs at a scoring component, the inputs including flags associated with interaction between the one or more teams and one or more simulated control systems with respect to a set of challenges of the competition, wherein one or more characters of the flags indicate a team, a location and a device location storing the flags, and wherein the scoring component tracks scores of the one or more teams and assigns points associated with the flags to the corresponding team;
displaying, via a model component, one or more effects associated with the challenges of the set of challenges, the model component being connected to the scoring component;
querying the scoring component periodically for the score; and
switching the one or more effects being displayed on the model component between corresponding teams of the one or more teams,
wherein the one or more effects correspond to completed challenges of the set of challenges performed in the one or more simulated control system of each team of the one or more teams, and
wherein the set of challenges corresponds to a set of security intrusions of the one or more simulated control systems and the points in association with the flags are based on a difficulty associated with a respective security intrusion or a speed in which the respective security intrusion is performed or a combination thereof.

10. The method of claim 9, wherein the flags comprise unique identifiers disposed in one or more programmable logic controllers (PLCs) or virtual devices of the one or more simulated control systems.

11. The method of claim 9, wherein one or more human-machine interfaces are connected to the one or more simulated control systems.

12. The method of claim 9, wherein a state of the model component being displayed corresponds with a particular team of the one or more teams, and wherein the completed challenges from the set of challenges are displayed in the model component for the particular team.

13. The method of claim 9, wherein the one or more simulated control systems include a team-specific simulated control system for each team of the one or more teams.

14. The method of claim 13, wherein the team-specific simulated control system for each team of the one or more teams is provided as a parallel instance.

15. The method of claim 9, wherein the one or more simulated control systems connect to one or more publicly accessible resources as an entry point for the one or more teams.

16. The method of claim 9, wherein the one or more simulated control systems are connected to a shared computing resource, the set of challenges being performed in the one or more simulated control systems or the shared computing resource.

* * * * *